United States Patent [11] 3,597,693

[72] Inventor Joseph Hood McNeilly
Harlow, Essex, England

[21] Appl. No. 709,617
[22] Filed Mar. 1, 1968
[45] Patented Aug. 3, 1971
[73] Assignee International Standard Electric Corporation
New York, N.Y.
[32] Priority Mar. 28, 1967
[33] Great Britain
[31] 13952/67

[54] NONLINEAR DECODER
10 Claims, 6 Drawing Figs.

[52] U.S. Cl. 325/321, 178/88, 329/104, 329/106
[51] Int. Cl. H03k 13/16
[50] Field of Search 325/321, 126, 38, 326; 178/88; 179/15, 15 AB; 320/1; 328/145, 151; 329/104, 106, 109; 307/234, 246, 265, 228; 340/206

[56] References Cited
UNITED STATES PATENTS
3,191,065 6/1965 Vagiu 307/88.5
3,480,948 11/1969 Lord 340/347

*Primary Examiner*—Benedict V. Safourek
*Assistant Examiner*—Kenneth W. Weinstein
*Attorneys*—C. Cornell Remsen, Jr., Rayson P. Morris, Percy P. Lantzy, Philip M. Bolton and Isidore Togut

ABSTRACT: A decoder having a sinh expansion characteristic rather than the normal logarithmic characteristic is described. The code input is converted to a pulse width modulated (PWM) signal of either positive or negative polarity, as indicated by the condition of the most significant digit, having a width $t$ proportional to the numerical value represented by the code input. The PWM signal then controls the charging of a capacitor for time $t$. The capacitor then is discharged from time $t$ to a fixed time T at which time the capacitor is sampled to provide the decoder output.

Inventor
JOSEPH H. McNEILLY
By Alfred C. Hill
Agent

Inventor
JOSEPH H. McNEILLY
By Alfred C. Hill
Agent

Inventor
JOSEPH H. McNEILLY
By Alfred C. Hill
Agent

NONLINEAR DECODER

BACKGROUND OF THE INVENTION

This invention relates to PCM (pulse code modulation) decoders and more particularly to PCM decoders having nonlinear expansion characteristics.

The use of coders and decoders employing nonlinear companding techniques is well known. For example, coders and decoders using damped wave trains to achieve the nonlinear characteristics are known. However, in such nonlinear systems the compression and expansion processes follow a true logarithmic law which does not pass through the origin and is, therefore, to a large extent unacceptable.

SUMMARY OF THE INVENTION

An object of the present invention is to provide a decoder having a nonlinear expansion characteristic which passes through the origin.

A convenient nonlinear compression law in the coder is that which has the general form $v=f(t)e^{at}$, where $v$ is the coder input, $t$ is the effective output, $f(t)$, the time variation applied to the detector threshold, is a positive function, $e$ is the base of the natural logarithm and $a$ is equal to the inverse of a time constant. Clearly $f(t)$ is further limited in that the compression law must be single valued and we shall assume that this is so.

Another object of the present invention is to provide a decoder having a nonlinear expansion characteristic which is the inverse of the above compression law.

A feature of the present invention is the provision of a nonlinear decoder comprising a source of code signal; first means coupled to the source to generate a first nonlinear waveform in response to the code signal, the first waveform having a fixed initial amplitude and varying therefrom according to a first given law for a first time proportional to the numerical value represented by the code signal; second means coupled to the first means for generating a second nonlinear waveform having an initial amplitude determined by the amplitude of the first waveform at the first time and varying therefrom according to a second given law; and third means coupled to the second means to sample the second waveform at a second time greater than the first time to provide the decoder output.

In a preferred embodiment of the invention, the first nonlinear waveform is an exponentially rising waveform having an initial amplitude of zero and the second nonlinear waveform is an exponentially falling waveform having an initial amplitude equal to the amplitude of the first waveform at the first time $\underline{t}$.

If we consider the simplest case when $f(t)$ can be produced as the voltage across a capacitor-resistor (CR) circuit with time-constant $1/a$, then the expanded output may be obtained in a manner to be described. The decoder receives a code signal representing $\underline{t}$ for a coder input $v$, where $$v=f(t)e^{at}.$$

From the code signal, a width modulated pulse is produced, its width being proportional to $t$. During the interval $t=0$ to $t=\underline{t}$, the voltage on a capacitor follows $f(t)$. At time $\underline{t}$, the function $f(t)$ is switched off and the capacitor voltage decays from the instantaneous value $f(t)$ with time constant $1/a$. The capacitor voltage is sampled at a second time, namely, a fixed time $t=T$ being greater than maximum value of $\underline{t}$. The output from the decoder is then $$v=f(t)e^{1a(T1t)}=e^{1aT}f(t)e^{at}$$

which is proportional to the coder input since $T$ is fixed.

BRIEF DESCRIPTION OF THE DRAWING

The above-mentioned and other features and objects of this invention will become more apparent by reference to the following description taken in conjunction with the accompanying drawings, in which.

Figure 1:
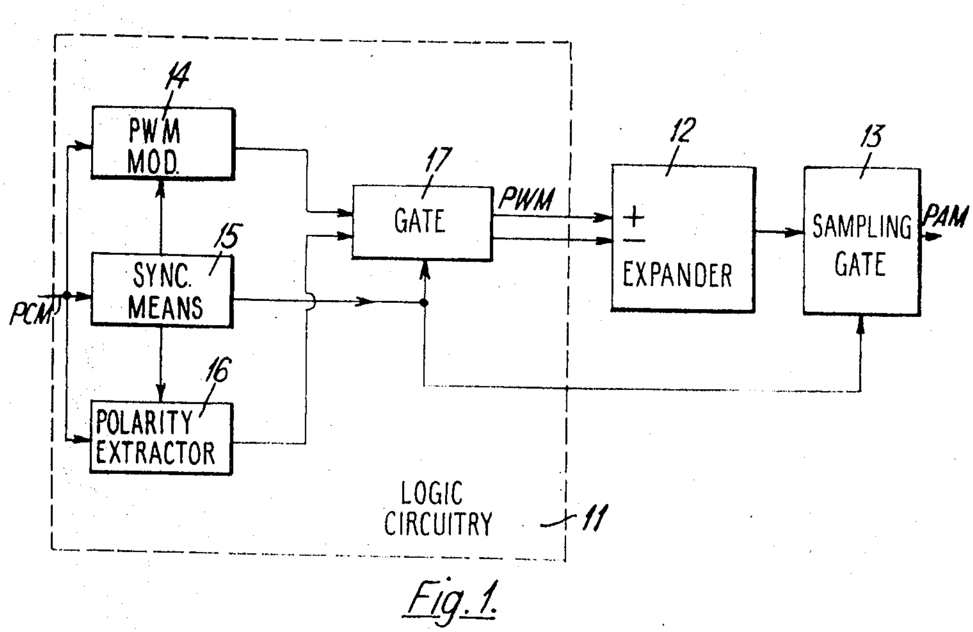
FIG. 1 is a block diagram of a decoder in accordance with the principle of the present invention.

In the arrangement shown in FIG. 1, the incoming PCM signal or code signal which takes the form of a binary number indicating the level transmitted, is applied to logic circuitry 11, the function of which is to produce a width modulated pulse, the width of the pulse being related to the incoming binary number. The pulse is then fed to expander circuit 12 the output of which is sampled by gate 13 to give an amplitude modulated output pulse. The design of logic 11 is straightforward and includes three main sections, pulse width modulator 14, synchronizing means 15, polarity extractor 16, and gate 17. The logic will be described in greater detail later That part of FIG. 1 which is mainly concerned with the present invention is expander circuit 12, the detailed circuit of which is shown in FIG. 2.

Figure 2:
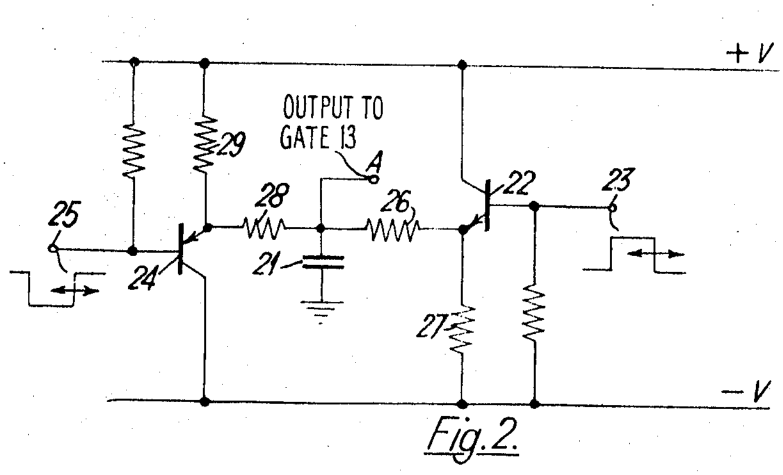
FIG. 2 is a circuit diagram illustrating the expander of FIG. 1.

The principle of the expander of FIG. 2 is that a capacitor 21 which is charged from a fixed voltage source for a time $\underline{t}$ is then discharged for a time $T-\underline{t}$ before being sampled at a fixed time $T$.

It is advisable to note at this point that the arrangement of logic 11 in FIG. 1 is such that one of two PWM outputs are available depending on the polarity of the originally encoded sample.

Figure 3:
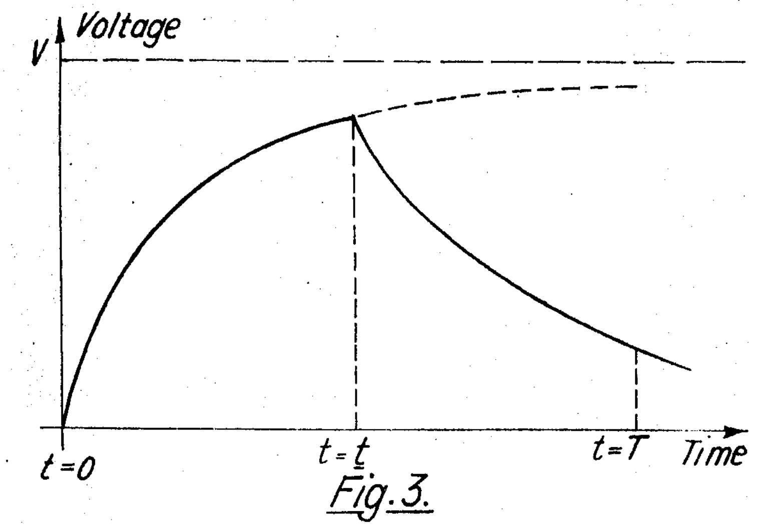
FIG. 3 is a graph illustrating the appearance of the first and second waveforms in the circuit of FIG. 2.

Thus, in the circuit of FIG. 2 transistor 22 only conducts when a positive PWM input appears at terminal 23 and transistor 24 only conducts when a negative PWM input appears at terminal 25. In either case the transistor which is not conducting receives no input and remains turned off. When transistor 22 conducts capacitor 21 charges up positively through resistor 26 and when the transistor is cut off by the trailing edge of the PWM pulse capacitor 21 discharges to zero, as shown in FIG. 3, since the resistor network is symmetrical. In other words with both transistors cut off the DC voltage at point A is zero. Similarly if the incoming PCM code represents a negative sample then a negative going PWM pulse is applied to the base of transistor 24 and capacitor 21 is charged negatively for a time $\underline{t}$ after which it discharges to zero. The voltage on the capacitor is sampled at a fixed time $T$ after the start of the charging time $t=0$ to obtain the expanded analog output.

Consider now a PWM pulse of duration $\underline{t}$, being a linear function of the incoming PCM code. The companding law which will be described is a sinh law, i.e. the signal is subjected to an inverse hyperbolic sinh law compression in the coder and a corresponding expansion takes place in the decoder. The circuit of FIG. 2 will achieve this particular expansion law if the rate of charge of the capacitor is twice the rate of discharge. Thus, the voltage across capacitor 21 rises during the period $t=0$ to $\underline{t}=t$ as $V(1-e^{12at})$, where V is the fixed amplitude of the charging pulse, and from time $\underline{t}$ onwards it falls exponentially as $e^{1at}$. At a fixed time $t=T$, this voltage is sampled and the result is the expanded decoded output which is proportional, apart from any quantizing error, to the original coder input.

At time $T$ the voltage $v_1$ across the capacitor for a pulse width $\underline{t}$ is $$v_1=V(1-e^{-2at})e^{-a(T-t)}$$

$$=2Ve^{-at}\frac{(e^{at}-e^{-at})}{2}$$

$$=2Ve^{-aT}\sin h\ at$$

Since $V$ and $T$ are fixed, then by substitution of a constant $K$ $$v_1=2K \text{ Sinh at},$$

where $\underline{K}=Ve^{1aT}$

Figure 4:
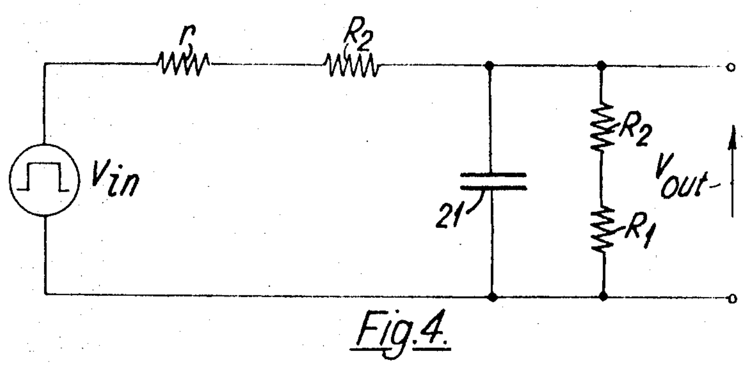
FIG. 4 is the equivalent circuit required for the first portion of the curve shown in FIG. 3.

The arrangement of FIG. 1 has the advantage that the output is obtained by a single sampling operation at a fixed time $T$ relative to the start of the decoding process. The requirement that the charging rate of capacitor 21 be twice the rate of discharge is obtained simply by the correct choice of resistors $R_2$ and $R_1$. It should be noted that the network is symmetrical. FIG. 4 shows the equivalent circuit to FIG. 2 when the capacitor is being charged, where resistor $r$ is the output impedance of the relevant transistor and $V_{in}$ is the amplitude of the applied pulse. From this is obtained $$\frac{dV_{out}}{dt}+2aV_{out}=\frac{V_{in}}{C(r+T_2)},$$

where $$2a=\frac{R_1+2R_2+r}{(R_1+R_2)(R_2+r)C}$$

and C is the value of the capacitor 21.

Hence, $$V_{out}=\frac{V_{in}(R_1+R_2)}{R_1+2R_2+r}1-e^{-2at}$$

Figure 5:
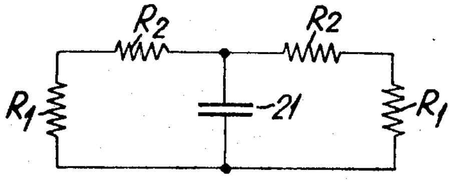
FIG. 5 is the equivalent circuit required for the second portion of the curve shown in FIG. 3.

FIG. 5 shows the AC equivalent circuit for discharge and if the initial voltage on capacitor 21 is $V_o$ then as it discharges it is clear that $$V_c=V_0e-\frac{2t}{C(R_1+R_2)}$$

to obtain sinh law expansion this equation should be $V_c=V_0e^{1at}$. Therefore, $$2a=\frac{4}{C(R_1+R_2)}=\frac{R_1+2R_2+r}{(R_1+R_2)(R_2+r)C}$$

i.e., $R_1=2R_2+3r$

Figure 6:
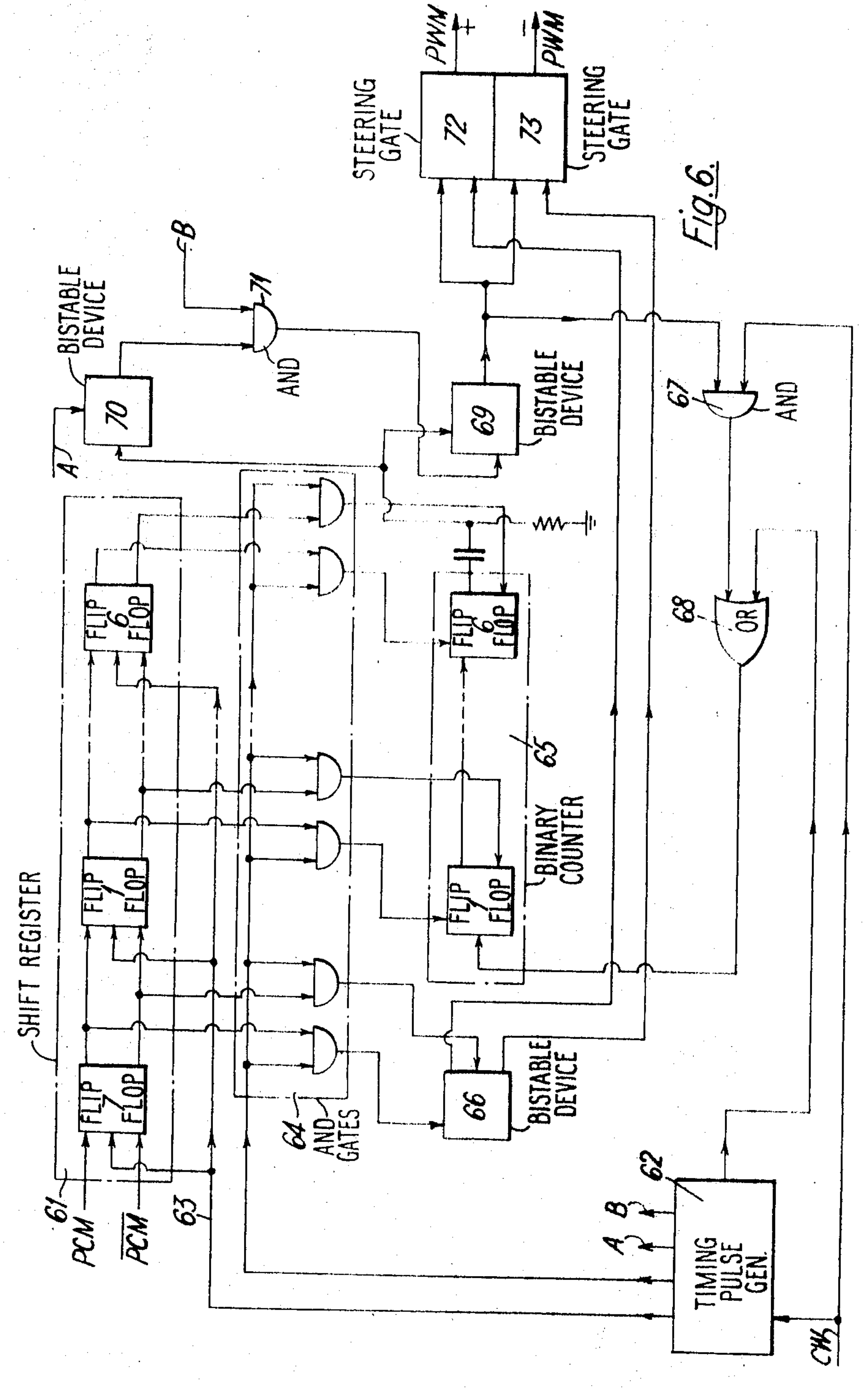
FIG. 6 is a block diagram of the logic circuitry of FIG. 1.

Reference has been made to the logic circuitry of FIG. 1. This is shown in some detail in FIG. 6 and is designed to produce a width modulated pulse of the appropriate polarity, the width of the pulse being linearly related to the value of the incoming code. It is assumed that the incoming code is a straightforward binary code and that each digit position thereof has a weight according to a binary scale. The incoming PCM, in this case six digits plus one polarity digit, is first read into flip-flops 1—6 of shift register 61 with the polarity digit going into flip-flop 7 thereof. The whole of the logic circuitry operates under the control of timing pulses from generator 62. Thus, the read-in to register 61 is under the control of shift pulses on line 63. At the end of each frame period the contents of flip-flops 1—6 of register 61 are transferred via a set of gates 64 under the control of a transfer pulse from generator 62 to flip-flops 1—6 of binary counter 65 and the polarity digit is simultaneously transferred by one of the set of gates of bistable device 66. The six amplitude pulses in the incoming code are used to preset the counter according to their significances, in the particular arrangement the counter flip-flops are set to the inverse of the code values, i.e., O becomes 1 and 1 becomes 0. The value of the incoming code is then equal to the number of pulses required to step counter 65 round until all the counter positions are set to a 1 condition. To produce the width modulated pulse output it is merely necessary to gate enough clock pulses CW via AND gate 67 into the counter to fill it. Since it is easier to detect the transition from 111111 to 000000 than it is to detect the 111111 condition, a single pulse from generator 62 is added in front of the gated clock pulse train via OR gate 68. This extra pulse means that the counter will now complete the transition to the 000000 condition instead of stopping at 111111. The width modulated pulse is derived from bistable device 69 which is switched on and receives the output from counter 65 when the latter is being filled, the bistable switching off when the transition occurs, i.e., when the largest digit in the counter switches from 1 to 0.

However, if the PCM input is of value zero, the counter would, as described above, be preset to 111111 and the single pulse required for the transition would also produce in bistable device 69 an output one unit in duration. To prevent this extra pulse, which in fact would appear in every output regardless of the PCM value, additional timing controls must be imposed on the logic. Two start pulses A and B are required.

Start pulse A is applied to bistable device 70 together with the counter output and start pulse B is applied to bistable 69 via gate 71 if bistable device 70 is switched on.

The sequence of operation is as follows:

1. The inverted PCM is used to preset counter 65.
2. Bistable device 70 is switched on by start pulse A.
3. A single pulse is fed to counter 65 via OR GATE 68
4. Start pulse B is applied to AND gate 71.
5. If the single pulse has caused the transition from 111111 to 000000 in the counter, bistable device 70 will be switched off and bistable device 69 will not turn on.
6. If, for any code input other than zero, the single pulse via gate 68 does not cause the transition, bistable device 70 will not switch off, coincidence between start pulse B and the output of bistable device 70 will occur, gate 71 will open and bistable device 69 will switch on. Switching on of bistable device 69 allows the output therefrom to open gate 67 in conjunction with the clock pulses CW and so fill the counter.
7. When the counter transition occurs both bistable devices 70 and 69 will be switched off and the output from bistable device 69 will disappear. This in turn means that gate 67 will close and cut off the input to the counter The output of bistable device 69 is therefore limited in duration to the number of clock pulses CW required to fill counter 65.
8. The output from bistable device 69 is further gated with the output from the polarity bistable 66 in two steering gates 72,73 to give a positive output at one terminal and a negative output at the other, these outputs being fed t0 the expander of FIG. 2.

While I have described above the principles of my invention in connection with specific apparatus, it is to be clearly understood that this description is made only by way of example and not as a limitation to the scope of my invention as set forth in the objects thereof and in the accompanying claims.

I claim:

1. A nonlinear decoder comprising:
a source of binary code signal representing a numerical value;
first means coupled to said source to convert said binary code signal to a pulse width modulated signal having a width proportional to said numerical value and to generate a first nonlinear waveform in response to said pulse width modulated signal, said first waveform having a fixed initial amplitude and varying therefrom according to a first given law for a first time proportional to the width of said pulse width modulated signal;
second means coupled to said first means for generating a second nonlinear waveform having an initial amplitude determined by the amplitude of said first waveform at said first time and varying therefrom according to a second given law; and
third means coupled to said second means to sample said second waveform at a second time greater than said first time to provide an amplitude modulated output for said decoder.

2. A decoder according to claim 1 wherein
said second time is fixed.

3. A decoder according to claim 1, wherein
said first waveform is an exponentially rising waveform having an initial amplitude equal to zero.

4. A decoder according to claim 1, wherein
said second waveform is an exponentially falling waveform.

5. A decoder according to claim 1, wherein
said first waveform is an exponentially rising waveform having an initial amplitude equal to zero, and
said second waveform is an exponentially falling waveform

6. A decoder according to claim 1, wherein
said first means includes
a capacitor, and
fourth means coupled to said source and said capacitor. said fourth means converting said binary code signal to said pulse width modulated signal to charge said capacitor for a time equal to said first time; and
said second means includes
fifth means coupled to said capacitor to discharge said capacitor for a time from said first time to said second time.

7. A decoder according to claim 6, wherein said second time is fixed.

8. A decoder according to claim 6, wherein said fourth means includes fifth means coupled to said source to convert said binary code signal into a width modulated pulse having a width proportional to said numerical value represented by said binary code signal, and sixth means to couple said width modulated pulse from said fifth means to said capacitor to control the charging of said capacitor.

9. A decoder according to claim 8, wherein said fifth means includes a binary shift register coupled to said source to store said binary code signal, a binary counter coupled to said shift register to receive the digits stored in said shift register, means coupled to said counter to step said counter until the count therein is reduced to zero, and means coupled to said counter to produce said width modulated pulse.

10. A decoder according to claim 9, wherein said second time is fixed.